US005673113A

United States Patent [19]

Blanc

[11] Patent Number: 5,673,113

[45] Date of Patent: Sep. 30, 1997

[54] ANALYSIS DEVICE FOR THE AUTOMATIC GRADING OF PRODUCTS, IN PARTICULAR OF FRUITS OR VEGETABLES

[75] Inventor: Philippe Blanc, Montauban, France

[73] Assignee: Materiel pour l'Arboriculture Fruitiere, Montauban, France

[21] Appl. No.: 625,032

[22] Filed: Mar. 29, 1996

[30] Foreign Application Priority Data

Apr. 6, 1995 [FR] France .................................. 95 04361

[51] Int. Cl.[6] .............................. B03D 1/00; G01N 9/04; G01J 1/40

[52] U.S. Cl. .......................... 356/429; 356/234; 209/579; 250/223 R

[58] Field of Search .................................... 356/429, 236, 356/406, 407, 416, 425; 250/223 R, 226, 560, 224, 228; 209/576, 577, 578, 579, 580, 581, 582, 585, 586, 587; 358/106, 107

[56] References Cited

U.S. PATENT DOCUMENTS

| | | | |
|---|---|---|---|
| 4,281,933 | 8/1981 | Houston et al. | 356/425 |
| 4,351,437 | 9/1982 | Long | 209/545 |
| 4,666,045 | 5/1987 | Gillespie et al. | 209/585 |
| 4,825,068 | 4/1989 | Suzuki et al. | 250/223 |
| 5,017,798 | 5/1991 | Murakami et al. | 250/572 |
| 5,216,485 | 6/1993 | Bird et al. | 356/394 |

FOREIGN PATENT DOCUMENTS

| | | |
|---|---|---|
| 0258810 | 3/1988 | European Pat. Off. . |
| 0620051 | 10/1994 | European Pat. Off. . |
| 89/06782 | 7/1989 | WIPO . |

*Primary Examiner*—Frank G. Font
*Assistant Examiner*—Michael P. Stafira
*Attorney, Agent, or Firm*—William R. Hinds

[57] ABSTRACT

The invention relates to an analysis device for the automatic grading of products, in particular of fruits or vegetables, comprising punctiform lighting means (4, 8, 12) capable of generating a polarised incident beam, means (19) for deflecting the polarised incident beam which are capable of forming a crosswise line of light, lateral reflection means (22, 23) capable of allowing the products to be lighted laterally, lower reflection means (28, 29) capable of allowing the lower face of the products to be lighted, and separation means (6, 10, 14) aligned on the optical axis of the polarised incident beam and suited to separating said incident beam and the backscattered depolarised light energy.

11 Claims, 2 Drawing Sheets

ANALYSIS DEVICE FOR THE AUTOMATIC GRADING OF PRODUCTS, IN PARTICULAR OF FRUITS OR VEGETABLES

The invention relates to an analysis device for the automatic grading of products, in particular of fruits or vegetables.

Numerous techniques exist at the present time which are designed to permit the analysis of products such as fruits or vegetables, for the purpose of allowing an automatic grading of these products so as to obtain batches that are homogenous both as to quality and to coloration.

An initial technique consists in arranging one or more camera(s) above and/or on the side of a conveyor so as to analyse a portion of the surface of the fruits or vegetables transported thereon. However, this solution leads to a significant number of errors, since only a portion of the surface of the products is analysed. As a result, the defects that these products possess on their non-visible faces are not allowed for in the grading.

In order to remedy this drawback, one solution consists in arranging four cameras distributed around a conveyor, on a level with its junction with another conveyor raised in height with respect to the latter, so as to analyse the fruits as they fall. This solution makes it possible, in fact, to analyse the greater part of the surface of the products. However, and more importantly, this solution does not make it possible to analyse the whole of the upper and lower faces of the products. Moreover, because the products are made to fall, there is a real risk of them being damaged.

Another very commonly used technique consists in arranging a camera above the conveyor, and in causing the product to rotate on itself at high speed in line with this camera. Like the previous one, this solution makes it possible to inspect the greater part of the surface of the products.

However, because of the high speed of rotation to which the products are subjected, the risks of the latter being damaged are considerable.

In order to remedy all these drawbacks, other solutions have been proposed, consisting for example in suspending the products or in transporting them on a transparent conveyor. However, these solutions have proved to be unusable in practice.

Finally, a last technique described in the patent EP 258 810 consists in arranging a camera above the conveyor, a plurality of mirrors distributed above and on the sides of this conveyor so as to allow the camera to visualize the upper face and the lateral faces of the products, and a plurality of lighting fixtures distributed above the conveyor. With the exception of the lower face of the products resting on the conveyor, this solution therefore makes it possible to analyse the greater part of the surface of said products without the risk of damaging the latter. However, the implementation of such a technique proves to be relatively complex. Said implementation makes it necessary, in fact, to arrange the lighting fixtures so as not to dazzle the camera, an arrangement which proves difficult to obtain if it is desired to obtain uniform lighting. Similarly, the relative positions of the camera and the various mirrors have to be perfectly defined, which proves to be somewhat difficult on account of the floor-space problems linked to the presence of the conveyor. Moreover, the principle adopted, which consists in using a CCD camera divided into analysis segments, leads to a considerable reduction in the resolution of the sensor.

The present invention sets out to remedy all the drawbacks of the techniques described above and has as its main objective to provide a device for the analysis of products which is very simple to implement and to use, and which also allows the whole of the surface of these products to be analysed without the risk of damage to the latter.

To this end, the invention relates to an analysis device for the automatic grading of products, in particular of fruits or vegetables, moving longitudinally on a conveyor furnished with supports for said products which are suited to masking as little as possible the lower face of the latter, said analysis device comprising:

- punctiform lighting means suited to generating a polarised incident beam,
- means for deflecting the polarised incident beam which are suited to causing said beam to scan the upper surface of the conveyor along a line of light crosswise with respect to the direction of movement of said conveyor,
- first, so-called lateral, reflection means, arranged laterally with respect to the conveyor so as to intercept a portion of the line of light and to allow the products to be lighted laterally,
- second, so-called lower, reflection means, arranged below the conveyor so as to intercept a portion of the line of light reflected by the lateral reflection means and to allow the lower face of the products to be lighted,
- separation means aligned on the optical axis of the polarised incident beam and suited to separating said incident beam and the depolarised light energy backscattered by the products and the reflection means,
- a collection chain comprising sensors arranged so as to receive the backscattered light energy, and suited to delivering analog signals representative, for each point of each line of light, of the light intensity of said point and
- a processing unit comprising analog/numeric conversion means suited to receiving the analog signals leaving the sensors and to converting said signals into series of numeric values, and calculation means suited to calculating, on the basis of pre-defined programmed criteria, usable items of grading information.

The principle of the invention therefore consists in generating a line of light scanning crosswise the surface of the conveyor, in deflecting this line of light, during this scanning, so as to light successively the whole of the circumference of the products, and to obtain for each point on said line of light, by means of reception means arranged along the same optical axis as that of the incident beam, an item of information representative of the light energy backscattered by said point.

Such a device therefore makes it possible to carry out a plurality of data collections in synchrony with the movement of the products, the computerized processing of which is not complicated in any way. For example, but in a non-limiting way, this processing can be performed by means of a unit such as that described in the patent application FR 2 703 932.

Similarly and as an example, the invention can apply to the grading of products transported on a sorter of the same type as that described in commonly assigned French patent application no. 95,02223 filed on 2 Feb. 1995 inventor Jacques Preview, the conveying fingers of which are particularly suited to allowing optical visualization of the external surface of the products.

According to another characteristic of the invention, the deflection means are suited to a portion of the line of light lighting directly one of the lateral faces and a portion of the upper face of the products, wherein the lateral reflection means extend almost vertically on the side of the conveyor so as to allow the other lateral face of the products to be lighted.

This arrangement makes it possible to limit advantageously the lateral space requirement of this analysis device.

With the same aim, the deflection means are preferably arranged well above the conveyor, intermediate reflection means being arranged between said deflection means and the lateral reflection means so as to deflect the line of light and allow, on the one hand, a direct lighting of a portion of the surface of the products and, on the other, a projection of a portion of the line of light towards the lateral reflection means.

These intermediate reflection means comprise, in addition, with advantage, an oblique reflector arranged so as to deflect the line of light in the direction of the side of the conveyor opposite the lateral reflection means, and a lateral reflector arranged so as to project said line of light towards the products and the lateral reflection means.

Considering its layout and its low space requirement, such an analysis device can be used to equip conveyors comprising of two parallel conveying lines. To this end, and according to another characteristic of the invention, this analysis device comprises single deflection means common to the two conveying lines, and reflection means arranged symmetrically with respect to the longitudinal axis of said conveyor.

In this case, in addition, according to another characteristic of the invention, the lateral reflection means arranged on either side of the conveyor respectively have a height suited, on the one hand, on a level with their bottom part, to allowing the products transported on the adjacent conveying line to be lighted laterally and, on the other, on a level with their top part, to acting as an intermediate lateral reflector for the other conveying line.

Furthermore, the analysis device according to the invention comprises preferably additional reflection means laid out so as intercept the light line portion suited to lighting the products directly, so that the optical path of said light line portion is of the same order of magnitude as those of the light line portions projected towards the lateral and lower reflection means.

These additional reflection means make it possible to bring back the virtual image of the directly lighted surface to a distance comparable to the virtual images of the surface portions lighted by means of the lateral and lower reflection means. As a result, the various virtual images are grouped inside a relatively reduced depth of focus.

Furthermore, according to another characteristic of the invention, the analysis device comprises at least two lighting means, and optical means capable of mixing the incident beams delivered by the various lighting means, these optical means being, in addition, composed with advantage, for each of the lighting means, of a polarising cube.

For example, the lighting means can thus comprise a laser source suited to delivering a multi-line beam of preselected wavelengths, and a lighting source capable of generating a polarised monochromatic beam, such as those described in French patent application no. 2 703 932, as well as a laser source close to the infra-red such as that described in my commonly assigned French patent application no. 95 02402 filed on 24 Feb. 1995 in the name of the applicant.

Other characteristics, aims and advantages of the invention will emerge from the detailed description which follows with reference to the attached drawings, which represent as a non-limiting example a preferred embodiment of the latter.

In these drawings, which form an integral part of the present description:

Figure 1:
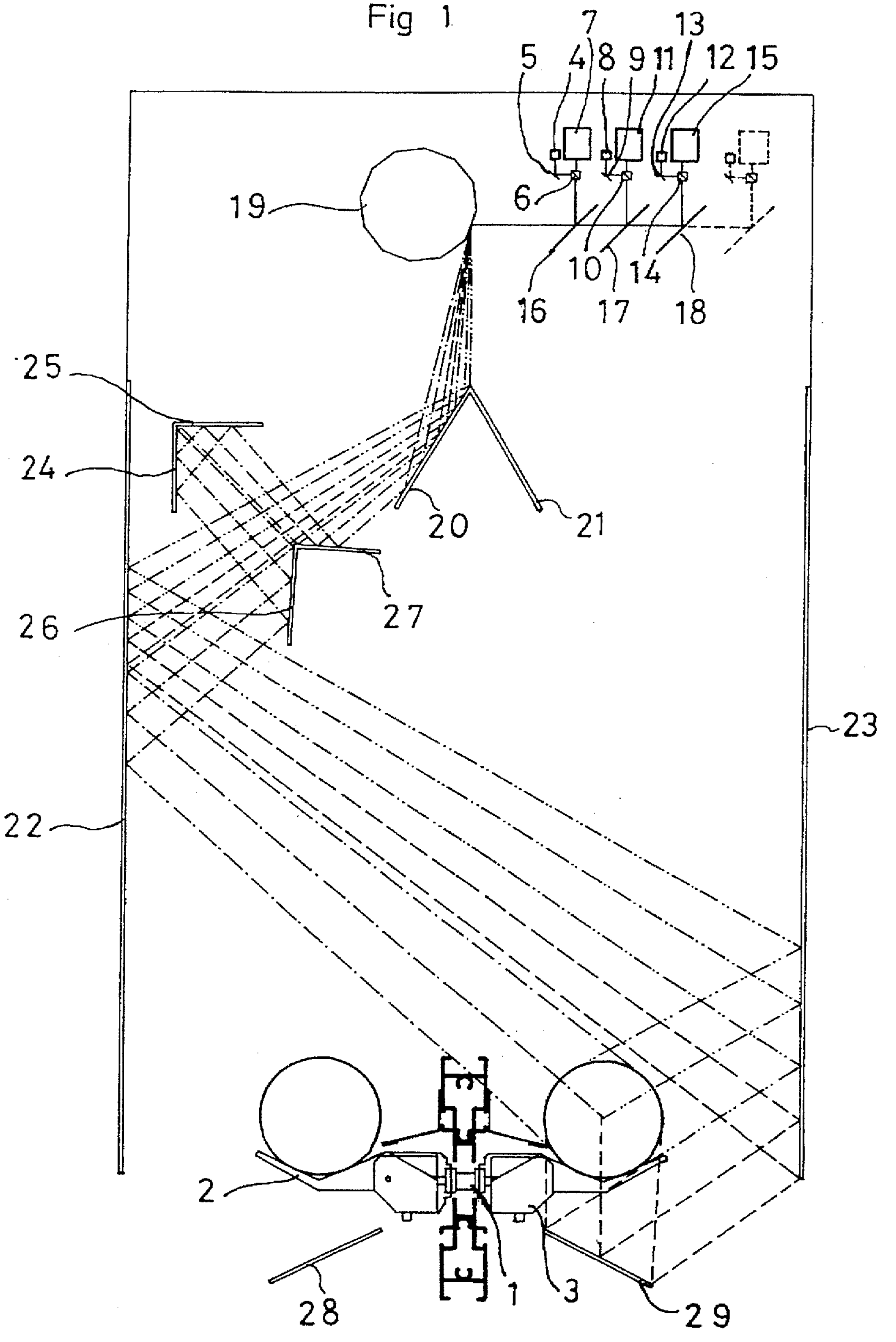
FIG. 1 is a diagrammatic view of a device according to the invention.

The analysis device according to the invention shown in FIG. 1 is arranged above a double conveying line of a sorter such as described in French patent application no. 95,02223 filed on 21 Feb. 1995, comprising an endless line 1 bearing two series of conveying fingers 2, 3 arranged opposite one another on either side of said line.

This analysis device comprises, firstly, sources of lighting of the products and means of receiving the back-scattered light energy, which are schematized on a reduced scale in FIG. 1 and are composed in the example of three assemblies conforming to those described respectively, on the one hand, in French patent application FR 2,703,932 and, on the other, in French patent application no. 95,02402 filed on 24 Feb. 1995, namely:

- a first assembly comprising a multi-line laser source 4 (multi-line diodes or lasers) whose beam is delivered by means of a deviation mirror 5 towards a polarising cube 6 distinguishing the outgoing and incoming beams. This first assembly comprises, in addition, schematized collection means at 7 which conform to those described in French patent application FR 2,703,932.
- a second assembly comprising a laser source 8 composed of a collimated laser diode close to the infrared whose beam is delivered by means of a deviation mirror 9 towards a polarising cube 10 distinguishing the outgoing and incoming beams. This second assembly comprises, in addition, schematized collection means at 11 which conform to those described in French patent application FR 95,02402.
- a third assembly composed of a range finder comprising a collimated infrared laser diode 12 whose beam is delivered by means of a deviation mirror 13 towards a polarising cube 14 distinguishing the outgoing and incoming beams. This third assembly comprises, in addition, a schematized collection chain at 15 which conforms to that described in French patent application FR 2,703,932.

The incident beams delivered by the three lighting sources 4, 8 and 12 are, in addition, delivered towards dichroic blades capable, on the one hand, of superimposing said beams and, on the other, of deflecting selected wavelengths and transmitting the other wavelengths:

- a dichroic blade 16 assigned to the first group and suited to deflecting wavelengths of less than 700 nanometres,
- a dichroic blade 17 assigned to the second group and suited to deflecting wavelengths of less than 800 nanometres and
- a dichroic blade 18 assigned to the third group and suited to deflecting wavelengths of less than 1 micron.

The superimposed beam leaving the lighting sources 4, 8, 12 is itself delivered towards a rotating polygon 19 provided with facets capable of reflecting said beam and of generating lines of light, said polygon being combined with means of rotational driving about a parallel axis in the direction of movement of the sorter. Such a rotating polygon 19 is for example suited to the angle at the top of the scanning being of the order of 60 degrees, of which only about 32 degrees will be utilized.

The analysis device comprises, in addition, reflection means capable of deflecting the line of light generated by the rotating polygon 19 so as to light successively the whole of the surface of the products transported on the two conveying lines 2, 3. It should be noted that in FIG. 1, for reasons of clarity, only the optical path allowing analysis of the products borne by one of the conveying lines 3 is shown. However, analysis of the products borne by the other conveying line 2 is obtained in identical fashion along an optical path symmetrical to that shown, on rotation of the rotating polygon 19.

The reflection means comprise, firstly, two mirrors 20, 21 forming a dihedron open at the bottom with a plane angle roughly equal to 60 degrees, the apex of which is arranged horizontally in the vertical plane of symmetry of the sorter.

These reflection means comprise, in addition, two lateral mirrors 22, 23 arranged vertically on either side of the sorter and extending roughly on a level lying between the conveying fingers 2, 3 and the apex of the mirrors 20, 21.

The reflection means comprise also, for each conveying line 2, 3, two assemblies of mirrors 24, 25 and 26, 27 interposed between the central mirror 20 (or 21) and a lateral mirror 22 (or 23) so as to extend the optical path of the portion of the line of light lighting the products directly. (It should be noted that in FIG. 1 only the mirrors 24–27 arranged above the conveyor line 2 are shown, it being understood that two similar assemblies are arranged in symmetrical fashion above the other conveyor line 3).

As shown in FIG. 1, each of these assemblies is composed of two mirrors 24, 25 and 26, 27 forming a right-angled dihedron the apex of which is horizontal, one of said mirrors 24, 26 of each of these assemblies extending vertically and the other mirror 25, 27 extending horizontally.

In addition, these two assemblies are offset laterally and vertically, the assembly 24, 25 nearest to the lateral mirror 22 being situated roughly on one and the same level as the central mirror 20, and the other assembly 26, 27 being located below said central mirror.

The reflection means comprise, finally, two lower mirrors 28, 29 each arranged below a conveyor line 2, 3 and suited to lighting the lower face of the products. As shown in FIG. 1, these mirrors 28, 29 are inclined at an angle of the order of 30 degrees compared with the horizontal so as to face the corresponding lateral mirror 22, 23 and to intercept a portion of the line of light reflected by the latter.

Figure 2:
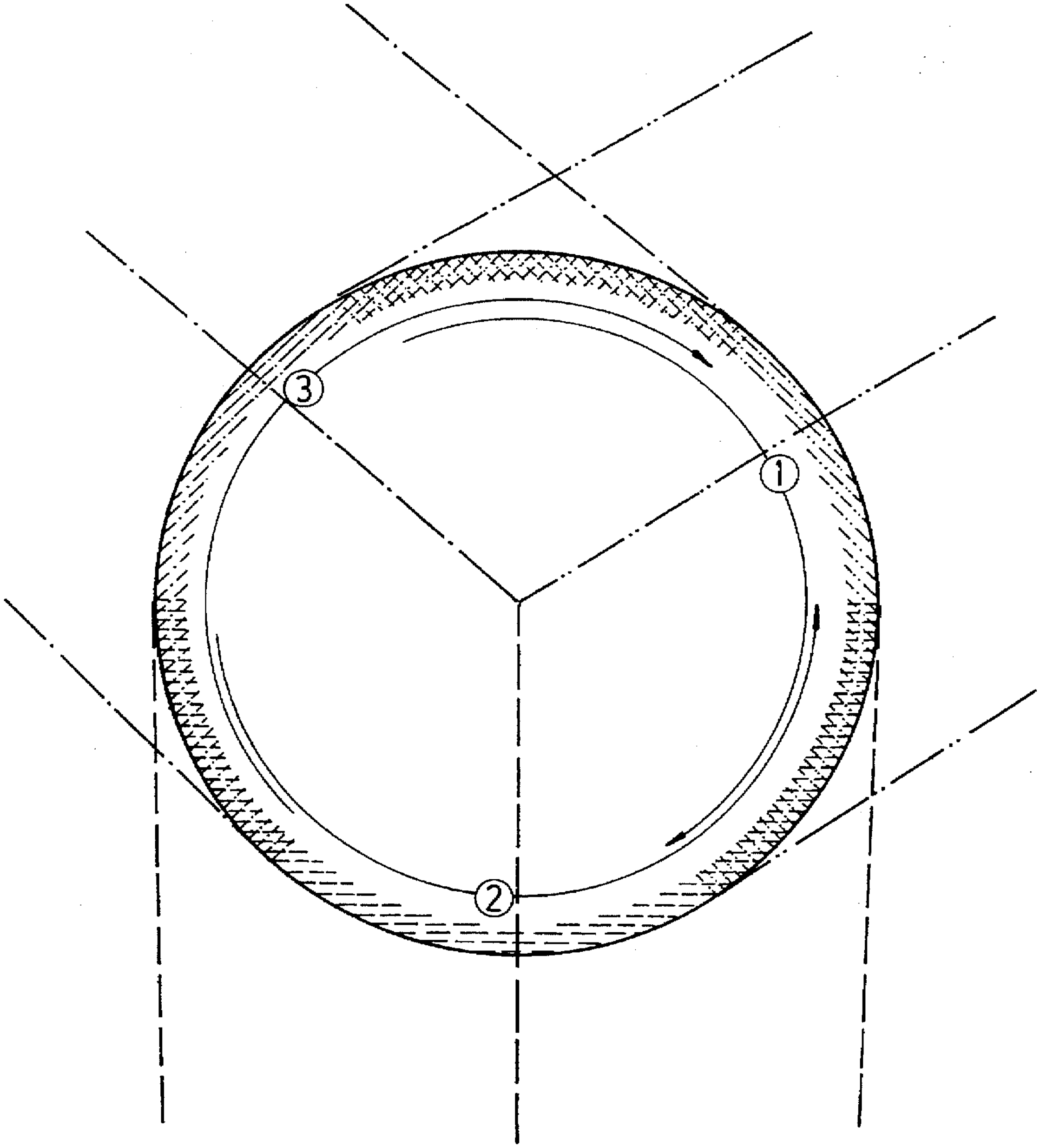
FIG. 2 is a view of a product analysed by means of a device according to the invention, on which are delimited the three surface zones analysed.

As shown in FIG. 2, the layout of these reflection means, whose width is of the order of some tens of millimetres, makes it possible to light successively three zones of the surface of the products on the rotation of the rotating polygon 19: a first zone 1 lighted by means of the lateral mirrors 22, 23, a second zone 2 lighted by means of the lateral mirrors 22, 23 and the lower mirror 29, and a third zone 3 lighted directly after reflection by the mirrors 24 27 and the lateral mirror 22.

In addition, these zones have overlapping portions which can optionally be processed by computer so as to avoid the repetition of one and the same defect, thus guaranteeing analysis of the whole of the surface of the products.

Such an analysis device makes it possible to collect, during each scan, a series of analog signals (for example 128 analog signals for each zone of the product), the initiation of the start of a cycle being for example controlled by means of a cell.

Moreover, the rate of scanning (performed in a time of the order of 66 microseconds) makes it possible to carry out a large number of data collections for each product (for example 128 collections of series of analog signals).

These analog signals are then processed by computer, for example in accordance with the processing algorithms described in the patent applications FR 2,703,932 and no. 95,02402, by means of a processing unit having preferably two memory levels which make it possible, in a first stage, to collect the whole of the data corresponding to two products arranged opposite one another, and then, in a second stage, to process this data during the following collections.

I claim:

1. Analysis device for the automatic grading of products, in particular of fruits or vegetables, moving longitudinally on a conveyor furnished with supports (2, 3) for said products which are suited to masking as little as possible the lower face of the latter, said grading device being characterised in that it comprises in combination:

punctiform lighting means (4, 8, 12) capable of generating a polarised incident beam, means (19) for deflecting the polarised incident beam which are capable of causing said beam to scan the upper surface of the conveyor along a line of light crosswise with respect to the direction of movement of said conveyor, first, lateral, reflection means (22, 23), arranged laterally with respect to the conveyor so as to intercept a portion of the line of light and to allow the products to be lighted laterally, second, lower, reflection means (28, 29), arranged below the conveyor so as to intercept a portion of the line of light reflected by the lateral reflection means (22, 23) and to allow the lower face of the products to be lighted, separation means (6, 10, 14) aligned on the optical axis of the polarised incident beam and suited to separating said incident beam and the depolarised light energy backscattered by the products and the reflection means (22, 23, 28, 29), a collection chain (7, 11, 15) comprising sensors arranged so as to receive the back-scattered light energy, and suited to delivering analog signals representative, for each point of each line of light, of the light intensity of said point and a processing unit comprising analog/numeric conversion means suited to receiving the analog signals leaving the sensors and to converting said signals into series of numeric values, and calculation means suited to calculating, on the basis of pre-defined programmed criteria, usable items of grading information.

2. Analysis device according to claim 1, characterised in that the deflection means (19) are suited to a portion of the line of light lighting directly one of the lateral faces and a portion of the upper face of the products, wherein the lateral reflection means (22, 23) extend roughly vertically onto the side of the conveyor so as to allow the other lateral face of the products to be lighted.

3. Analysis device according to claim 1, characterised in that the deflection means (19) are arranged well above the conveyor, intermediate reflection means (20, 21) being arranged between said deflection means and the lateral reflection means (22, 23) so as to deflect the line of light and to allow, on the one hand, a direct lighting of a portion of the surface of the products and, on the other, a projection of a portion of the line of light towards said lateral reflection means.

4. Analysis device according to claim 3, characterised in that the intermediate reflection means comprise an oblique reflector (20, 21) arranged so as to deflect the line of light in the direction of the side of the conveyor opposite the lateral reflection means (22, 23), and a lateral reflector (23, 22) arranged so as to project said line of light towards the products and said lateral reflection means.

5. Analysis device according to claim 3, for conveyors comprising two parallel conveying lines (2, 3), characterised in that it comprises single deflection means (19) common to the two conveying lines, and reflection means (20–23, 28, 29) arranged symmetrically with respect to the longitudinal axis of said conveyor.

6. Analysis device according to claim 4, characterised in that the lateral reflection means (22, 23) arranged on either side of the conveyor respectively have a height suited, on the one hand, on a level with their bottom part, to allowing the products transported on the adjacent conveying line (2, 3) to be lighted laterally and, on the other, on a level with their top part, to acting as an intermediate lateral reflector for the other conveying line.

7. Analysis device according to claim 1, characterised in that it comprises additional reflection means (24–27) laid out so as intercept the light line portion suited to lighting the products directly, so that the optical path of said light line portion is of the same order of magnitude as those of the light line portions projected towards the lateral (22, 23) and lower (28, 29) reflection means.

8. Analysis device according to claim 1, in which the deflection means comprise a polygon (19) furnished with facets capable of reflecting the incident beam, and means for the rotational driving of said polygon about an axis of rotation parallel with the direction of movement of the conveyor.

9. Analysis device according to claim 1, in which the separation means consist of a polarising cube (6, 10, 14).

10. Analysis device according to claim 1, characterised in that it comprises at least two lighting means (4, 8, 12), and optical means (16–18) capable of mixing the incident beams delivered by the various lighting means.

11. Analysis device according to claim 10, characterised in that the optical means are composed, for each of the lighting means (4, 8, 12), of a blade (16–18) with optical deflection which is selective for given wavelengths.

* * * * *